United States Patent Office 3,134,756
Patented May 26, 1964

3,134,756
COPOLYMERS OF DIALLYL BARBITURIC ACIDS AND SULFUR DIOXIDE
John R. Mattson, Maplewood, Minn., assignor to Minnesota Mining and Manufacturing Company, St. Paul, Minn., a corporation of Delaware
No Drawing. Filed Dec. 5, 1960, Ser. No. 73,480
3 Claims. (Cl. 260—79.3)

This invention relates to certain new and useful linear copolymers derived from sulfur dioxide and diallylbarbituric acids. These new linear copolymers can be termed poly-spiro [3′-sulfonylmethyl-cyclohexyl-1′,5-(barbiturate)] and are represented generically by the formula:

(1) 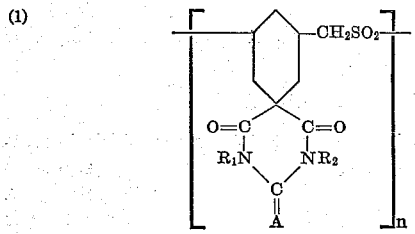

where $R_1$ and $R_2$ can be the same or different and are selected from the group consisting of hydrogen and lower alkyl, A is selected from the group consisting of oxygen and sulfur, and $n$ is a positive whole number greater than 1 (preferably an integer of from about 5 to about 300).

Polymers of Formula 1 form useful salts with alkali metals when $R_1$ is hydrogen. A generic formula for these salts can be written as follows:

(2) 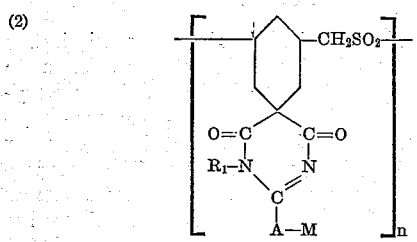

where $R_1$ is selected from the group consisting of hydrogen and lower alkyl, A is selected from the group consisting of oxygen and sulfur, M is selected from the group consisting of alkali metals and ammonium, $n$ is a positive whole number ranging from about 5 to 300.

As used in this application, the term "lower" has reference to less than 7 carbon atoms, and the term "alkali metals" has reference to those metals of group I-A of the periodic table of the elements, such as lithium, potassium, sodium, etc.

Preferred compounds of this invention are those of Formulas 1 and 2 wherein $R_1$ and $R_2$ are hydrogen, A is selected from the group consisting of oxygen and sulfur, M is sodium.

The compounds of this invention are readily prepared by contacting the appropriate diallylbarbituric acid compound with sulfur dioxide. The overall reaction can be summarized as follows:

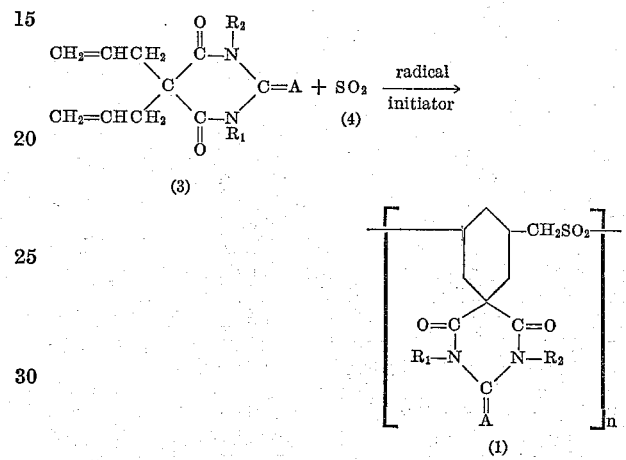

Any suitable radical initiator known to the art can be used to initiate the reaction. Of course, variations in the degree of radical formation produced by a given initiator, or a combination of initiators, will be observed with any given set of reactants. As those skilled in the art will readily appreciate, radical initiators which are degraded or otherwise inactivated by sulfur dioxide obviously will not produce the desired reaction. Suitable radical initiators include, for example, such materials as lauroylperoxide, benzoylperoxide, azobisisobutyronitrile, ditertiarylbutylperoxide, dicumylperoxide, actinic radiation such as ultraviolet light and the like.

Concerning quantity of the reactants employed, I prefer to use at least a 100 percent molar excess of $SO_2$. More preferably, I prefer to use at least a 300 percent molar excess of $SO_2$, with respect to the diallylbarbituric acid compound of Formula 3.

The amount of chemical radical initiator employed for a given reaction can in general vary between wide limits. Usually one will employ at least about 0.001 percent to 1 percent of radical initiator based on the combined weight of reactants. Commonly, not more than about 3 percent of radical initiator will be employed based on combined weight of reactants. The optimum amount of radical initiator to be employed in any given reaction will of course vary from reaction to reaction, and it is not possible to give the exact amount for every given combination of reaction conditions and reactants. However, as those of ordinary skill in the art will appreciate, one will use an amount of radical initiator which is sufficient to cause a reaction to proceed. When ultraviolet light is used as the radical initiator, one will employ an amount of illumination which will induce sulfur dioxide to react with compounds of Formula 3.

In general, I conduct the reaction at about 50 to 100° C., the optimum reaction temperature for any specific reaction is that which will produce the greatest extent of reaction between the compounds. Reaction times are generally under 24 hours.

The extent of the reaction after a given reaction period can be determined by distilling off the excess $SO_2$ and extracting the solid residue with hot alcohol (i.e., ethanol). The alcoholic solution is evaporated to dryness and the amount of residue which consists of unreacted compound of Formula 3 is determined gravimetrically.

The molecular weight is controlled by the use of chain transfer agents such as mercaptans and tetrahalomethanes (i.e., ethyl, butyl, actyl mercaptans and trichlorobromo, or dichlorodibromomethane). Varying proportions of chain transfer agent to $SO_2$ gives products having a range of $n$ from about 5 to 300.

The starting materials of Formula 3 can be prepared by any conventional means known to the art. Diallylbarbituric acid itself is commercially available and can be used to prepare the N-lower alkyl substituted derivatives by conventional alkylation procedures; see for example the procedures described in: Chemical Abstracts, 28, 2370 (1934), Chem. Abstract 27, 5083 (1933), Chem. Abstract 42, 573 (1948), Chem. Abstract 44, 6525 (1950), Chem. Abstract 46, 3154 (1952).

N-alkyl or N,N'-dialkyl derivatives of 5,5-diallyl barbituric acid can be made from the corresponding urea or thiourea derivatives and diallylmalonic ester.

I prefer to use $SO_2$ which is substantially free from impurities, but the purity of the $SO_2$ is, in general, not critical in producing products of the invention.

The metal and ammonium salts of Formula 2 are readily prepared from the appropriate free acidic compounds of Formula 1 by merely adding an alcoholic solution of an inorganic base containing the desired cation to a solution of the compound of Formula 1 in dimethylformamide. Similarly, to prepare amine salts, one simply adds a dimethylformamide solution of the appropriate compound of Formula 1 to an alcoholic solution of the desired amine. The solvent is then removed by distillation at low pressure.

Products of this invention prepared by the routes described above are comprised of optically active isomers, e.g., due to asymmetry about the common spiro carbon atom. The levoforms are believed to have the most biological activity.

Higher molecular weight polymers of Formula 1 (i.e., those of Formula 1 when $n$ is greater than 15) form an interesting and useful class of ion exchange resins when $R_1$, and preferably also $R_2$, are hydrogen. The polymers also serve as useful vehicles for fluorescent dyes.

Especially when A is sulfur in Formulas 1 or 2, the polymers are valuable tarnishproofing agents and can be incorporated into silver polishing compositions.

When lower molecular weight molecular weight polymers in Formula 1 (such as those of Formula 1 where $n$ is smaller than 15) are incorporated into organic silver halide type photosensitive coatings the resulting coatings act as valuable top layer blocking agents and also as area desensitization agents.

Lower molecular weight polymers of Formulas 1 and 2 such as those of Formula 1 where $n$ has a value of less than about 10 have interesting and unusual physiological activity. Thus, the compounds are hypnotic when $R_1$ is hydrogen, and when $R_1$ and $R_2$ are both lower alkyl in Formula 1, the compounds appear to be convulsants. The salts tend to have greater water solubility than the polymers of Formula 1. High molecular weight compounds have pharmacological utility especially tranquilizing activity.

The invention is further illustrated by refernece to the following examples:

EXAMPLE I

*Poly-Spiro[3'-Sulfonylmethyl-Cyclohexyl-1',5-(Barbituric Acid)]*

Diallylbarbituric acid 5 g. (0.024 mole), azobisisobutyronitrile 0.25 g. and 3.22 ml. of liquid $SO_2$ is charged to a 25 ml. Pyrex ampoule while flushing with nitrogen. The ampoule is cooled in liquid air, evacuated and sealed off. After heating with gentle agitation at 50° C. for 22 hours the ampoule is cooled in Dry Ice and opened. The excess $SO_2$ is allowed to evaporate leaving about 6.2 grams of white solid product melting over 250° C. with decomposition.

The product is dissolved in hot dimethylformamide and poured into a large excess of absolute ethanol. This process is repeated three times. The purified material is pulverized and dried at 120° C.

Calculated for $[C_{10}H_{12}N_2O_5S]_n$: 42.5% C, 4.2% H, 9.9% N, 11.3% S, where $n$ is about 100. Found: 42.0% C, 5.2% H, 10.7% N, 11.3% S. Inherent viscosity 0.65 in dimethylformamide.

EXAMPLE II

Diallylbarbituric acid 5 g. 0.024 mole, azobisisobutyronitrile, 0.25 g., 3.22 ml. of liquid $SO_2$ and 0.22 g., 0.0024 moles of butylmercaptan is charged to a 25 ml. Pyrex ampoule while flushing with nitrogen. The ampoule is cooled in liquid air, evacuated and sealed on. After heating the reaction mixture with gentle agitation at 50° C. for 18 hours, the ampoule is aagin cooled in Dry Ice and open. The excess sulfur dioxide is allowed to evaporate. The reaction mixture is removed from the ampoule, dissolved in hot dimethyl formamide and poured into a large excess of ethanol. This process is repeated 3 times and 5 g. of purified material is obtained. According to viscosity measurements this product has a value of $n$ equal to about 10.

EXAMPLE III

*Salts of Poly-Spiro[3'-Sulfonylmethyl-Cyclohexyl-1',5-(Barbituric Acid)]*

To a solution of 0.1 equivalent of the free acid in 100 ml. of dimethylformamide is added a solution of 0.1 mole of sodium hydroxide in 30 ml. of ethanol. The precipitate which consists of sodium poly-spiro[3'-sulfonylmethyl-cyclohexyl-1',5-(barbituric acid)] is dried under vacuum at about 50° C. for several hours. The same procedure is followed using corresponding stoichiometric equivalents of potassium hydroxide, and ammoinum hydroxide or a simple substituted ammonium hydroxide to prepare respectively, the K and ammonium salts of poly-spiro[3' - sulfonylmethyl - cyclohexyl - 1',5 - (barbituric acid)].

The following examples presented in tabular form as Table I show the preparation of additional compounds of Formula 1. A ten mole percent excess of sulfur dioxide over the amount of compounds of Formula 3 is employed in each instance. The amount of radical initiator employed is about 1 percent based on combined weight of reactants. Reaction time is about 24 hours in each instance. In all examples $n$ is greater than 100.

TABLE I

| Example No. | Substituents of Compounds of Formula 3 | | | Catalyst | Product |
|---|---|---|---|---|---|
| | A | $R_1$ | $R_2$ | | |
| IV | S | H | H | Benzoyl peroxide. | (structure with HN–C(S)–NH, OC, CO, –CH$_2$SO$_2$–) |
| V | O | CH$_3$ | H | Benzoyl peroxide. | (structure with HN–C(O)–NCH$_3$, OC, CO, –CH$_2$SO$_2$–) |
| VI | S | n-C$_3$H$_7$ | H | Benzoyl peroxide. | (structure with HN–C(S)–N–C$_3$H$_7$, OC, CO, –CH$_2$SO$_2$–) |
| VII | O | n—C$_6$H$_{13}$ | n—C$_6$H$_{13}$ | Azobisiso- butyro- nitrile. | (structure with C$_6$H$_{13}$–N–C(O)–NC$_6$H$_{13}$, OC, CO, –CH$_2$SO$_2$–) |

The claims are:

1. A linear copolymer composed substantially of repeating units of the formula:

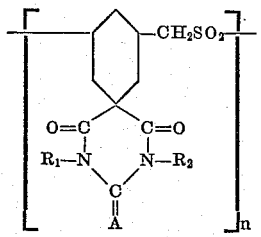

where $R_1$ and $R_2$ are selected from the group consisting of hydrogen and lower alkyl, A is selected from the group consisting of oxygen and sulfur, and $n$ is an integer from about 5–300.

2. A linear copolymer composed substantially of repeating units having the formula:

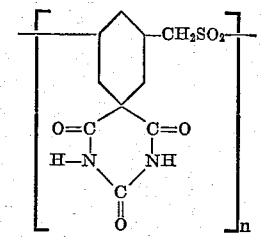

where $n$ is an integer from about 5 to 300.

3. A metal salt of a linear copolymer according to claim 2, said metal salt being a copolymer of the formula

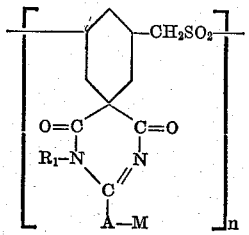

wherein $R_1$ is selected from the group consisting of hydrogen and lower alkyl, A is selected from the group consisting of oxygen and sulfur, M is selected from the group consisting of alkali metals and ammonium and $n$ is a positive whole number from about 5 to 300.

References Cited in the file of this patent

UNITED STATES PATENTS 1,261,235    Hussy _____ Apr. 2, 1918

OTHER REFERENCES

Butler et al.: Journal of American Chemical Society, volume 79 (1957), pages 3128–3131.

Chemical and Engineering News, volume 36, April 21, 1958, page 44.